US006989622B1

(12) United States Patent
Chen et al.

(10) Patent No.: US 6,989,622 B1
(45) Date of Patent: Jan. 24, 2006

(54) ALTERNATOR HAVING CLAW-POLE ROTOR

(75) Inventors: Hanyang B. Chen, Ypsilanti, MI (US); Michael T. York, Chelsea, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/996,496

(22) Filed: Nov. 23, 2004

(51) Int. Cl.
*H02K 1/22* (2006.01)

(52) U.S. Cl. .................................................. 310/263

(58) Field of Classification Search ............... 310/261, 310/263
See application file for complete search history.

(56) References Cited

U.S. PATENT DOCUMENTS

| | | | |
|---|---|---|---|
| 5,543,676 A | | 8/1996 | York et al. |
| 5,892,313 A | | 4/1999 | Harris et al. |
| 6,020,669 A | * | 2/2000 | Umeda et al. ............... 310/263 |
| 6,023,119 A | | 2/2000 | Asao |
| 6,097,130 A | * | 8/2000 | Umeda et al. ............... 310/263 |
| 6,127,763 A | * | 10/2000 | Nakamura et al. ........... 310/263 |
| 6,288,471 B1 | | 9/2001 | Kometani et al. |
| 6,373,166 B1 | | 4/2002 | Asao et al. |
| 6,417,594 B1 | | 7/2002 | Kometani et al. |
| 6,424,073 B1 | | 7/2002 | Kometani et al. |
| 6,433,456 B1 | | 8/2002 | Higashino et al. |
| 6,531,802 B2 | * | 3/2003 | Umeda ........................ 310/263 |
| 6,559,572 B2 | | 5/2003 | Nakamura |
| 6,608,424 B2 | | 8/2003 | Kusase |
| 6,680,552 B2 | | 1/2004 | Linden et al. |
| RE38,464 E | | 3/2004 | Kusase et al. |
| 6,700,296 B1 | | 3/2004 | Oohashi et al. |
| 6,703,758 B2 | | 3/2004 | Buening et al. |
| 6,703,759 B2 | | 3/2004 | Oohashi et al. |
| 6,707,227 B1 | | 3/2004 | York et al. |
| 6,724,116 B1 | | 4/2004 | Militello |
| 6,744,165 B2 | | 6/2004 | York |
| 6,747,384 B2 | | 6/2004 | Militello et al. |
| 6,750,581 B2 | | 6/2004 | Neet |
| 6,777,845 B2 | | 8/2004 | York et al. |
| 6,806,617 B1 | | 10/2004 | Chen et al. |
| 2003/0201687 A1 | | 10/2003 | Asai |
| 2004/0017128 A1 | | 1/2004 | York et al. |
| 2004/0066108 A1 | | 4/2004 | York |
| 2004/0119365 A1 | | 6/2004 | Breznak et al. |
| 2004/0160140 A1 | | 8/2004 | Shoykhet |
| 2005/0088056 A1 | * | 4/2005 | Kuribayashi et al. ....... 310/263 |

FOREIGN PATENT DOCUMENTS

GB        2 260 860 A       4/1993

* cited by examiner

*Primary Examiner*—Tran Nguyen
(74) *Attorney, Agent, or Firm*—Brinks Hofer Gilson & Lione

(57) ABSTRACT

An electric machine for a motor vehicle is provided, the electric machine generally comprising a claw-pole rotor and a stator circumscribing the rotor. Adjacent pole fingers of the rotor define a distance P representing the axial distance between the magnetic centers of the adjacent pole fingers. The stator generally includes a stator core defining a distance H representing the axial height of the lamination stack. Preferably, the electric machine has a ratio of P to H (P/H) in the range of 0.29 to 0.45, resulting in an improvement in the power output of the electric machine.

20 Claims, 5 Drawing Sheets

ALTERNATOR HAVING CLAW-POLE ROTOR

FIELD OF THE INVENTION

The present invention relates generally to electric machines such as an alternator having claw-pole rotors.

BACKGROUND OF THE INVENTION

Conventional automotive alternators are 3-phase alternators which have a stator and a rotor. The stator generally includes a stator core having three phases of conductors wound through the stator core. The stator core is typically constructed of a plurality of laminations stacked axially relative to the alternator's rotational axis. The rotor is generally a claw-pole or Lundell rotor and includes a number of alternating pole fingers which provides a circumferential surface facing the stator that alternates between north and south poles for generating an output current in the stator winding.

One drawback that is common to these alternators is a reduction in power output due to eddy current loss within the machine. In particular, the magnetic centers between adjacent pole fingers are spaced axially apart due to the inherent structure of the pole finger, which is generally a narrowing trapezoidal shape. As magnetic flux flows axially through the stator lamination stack from magnetic center to magnetic center, eddy current loss is induced. This eddy current loss dissipates electric power into waste heat and reduces the total output current from the alternator. It also increases the stator temperature and reduces the allowable ambient temperature of alternator operation. Due to these constraints, the conventional claw-pole alternator has an axial path distance between magnetic centers of adjacent pole fingers that is limited to about one-sixth of the height of the stator lamination stack (about 17% of the axial height).

Accordingly, there exists a need to provide an alternator having a claw-pole rotor which maximizes power output of the alternator while maintaining an acceptable level of eddy current loss.

BRIEF SUMMARY OF THE INVENTION

One embodiment of the present invention provides an electric machine for a motor vehicle, the electric machine generally comprising a claw-pole rotor and a stator circumscribing in the rotor. The rotor generally includes a pair of opposing pole pieces sandwiching a field coil therebetween. Each of the pole pieces have a plurality of circumferentially spaced pole fingers extending axially relative to the rotor's axis of rotation. The pole fingers of the rotor alternate between north and south magnetic pluralities upon energization of the field coil. Adjacent pole fingers define a distance P representing the axial distance between the magnetic centers of the adjacent pole fingers. The stator generally includes a stator core and a stator winding. The stator core includes a lamination stack defining a plurality of stator teeth. The stator winding includes a plurality of conductors positioned between the stator teeth which extend axially therethrough. The stator core defines a distance H representing the axial height of the lamination stack. The Applicants have discovered that forming the electric machine with the ratio of P to H (P/H) in the range of 0.29 to 0.45 results in an improvement in the power output of the alternator.

According to more detailed aspects, the electric machine is preferably an alternator, and may be a 3-phase alternator or may have a greater number of phases. When the alternator is of the 3-phase type, the stator preferably includes certain features that reduce eddy current losses. For example, the stator teeth may have narrow radial slots formed therein to reduce the cross-sectional area of each tooth through which the magnetic flux flows. With these narrow radial slots, eddy-current loss related to axial magnetic flux in the stator core is substantially reduced. Likewise, the circumferential width of each stator tooth may be smaller, which generally occurs when the number of stator teeth is at least three times greater than the total number of pole fingers.

The alternator preferably has a number of phases greater than three, such as a 6-phase alternator. Exemplary alternators are disclosed in commonly assigned U.S. Pat. No. 6,750,581 and co-pending application Ser. No. 10/723,527 filed Nov. 26, 2003, the disclosures of which are incorporated herein by reference in their entirety. In these alternators the number of stator teeth are generally at least three to six times greater than the total number of pole fingers.

Similarly, alternator designs which include a permanent magnet disposed between adjacent pole fingers may be designed with a ratio of P to H while maintaining acceptable eddy current losses. Further details of such designs may be found in commonly assigned U.S. Pat. Nos. 5,892,313, 5,543,676, and 6,747,384, the disclosures of which are incorporated herein by reference in their entirety. Preferably, the permanent magnet is disposed proximate a distal end of the pole finger located between the adjacent pole fingers of the single pole piece.

Preferably, the axial height of the lamination stack of the stator core is increased to cause an increase in the P to H ratio, although both the stack height as well as the axial length of the pole fingers may be increased to obtain an alternator having a P to H ratio in the aforementioned range. Preferably, the lamination stack of the stator core extends an axial distance greater than or about equal to the axial distance spanned by a pole finger, or spanned by the circumferential surface of the pole finger which underlies the stator core.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
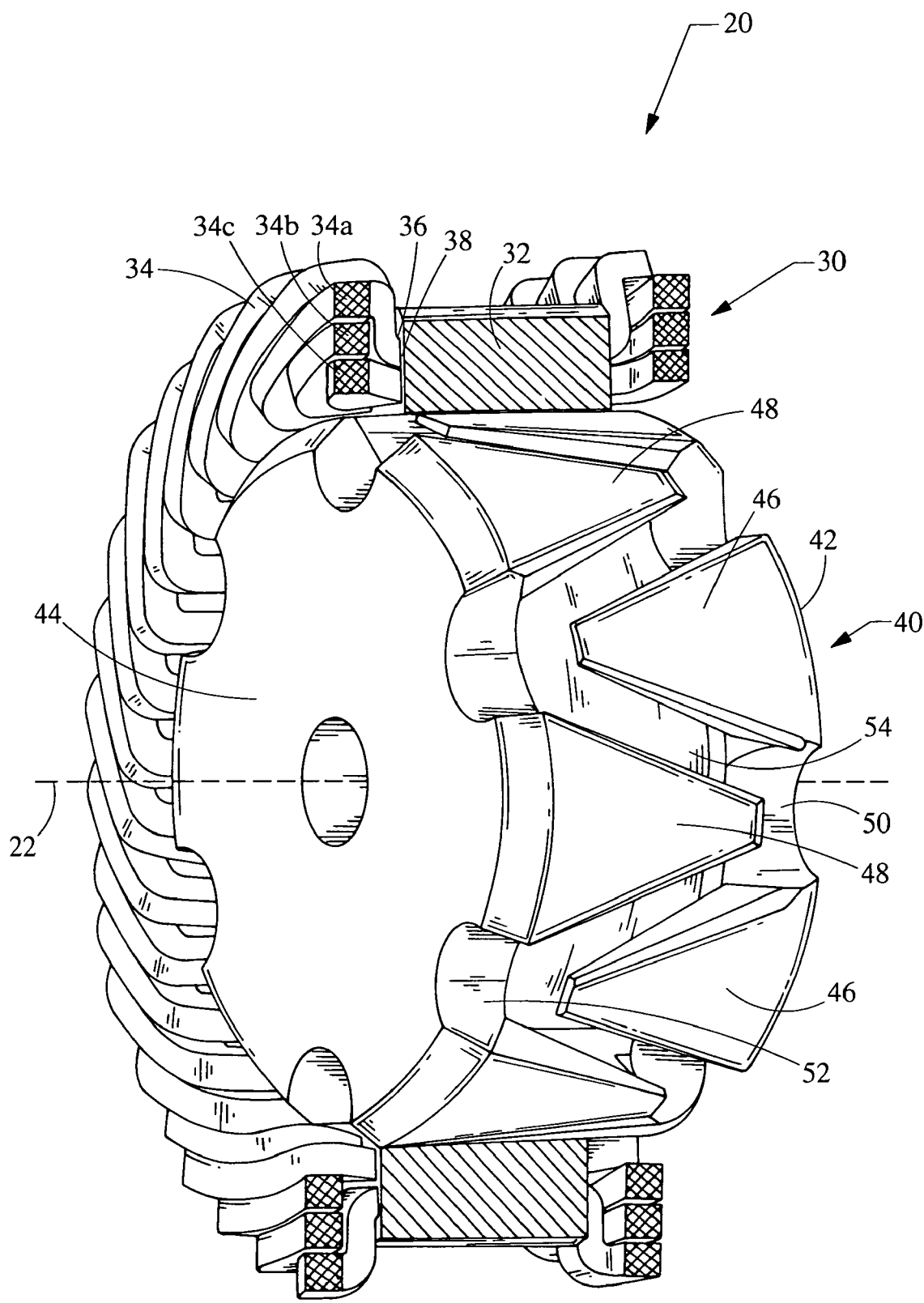
FIG. 1 is a perspective view, partially cut-away, of an electric machine constructed in accordance with the teachings of the present invention.

Turning now to the figures, FIG. 1 depicts a perspective view of an electric machine, and particularly an alternator 20 constructed in accordance with the teachings of the present invention. The alternator 20 generally includes a stator 30 which circumscribes a rotor 40. Rotation of the rotor 40 about its central axis 22 causes an output current to be induced in the stator 30, which is then routed through the electrical system to various portions of a motor vehicle.

The stator 30 generally includes a stator core 32 and a stator winding 34. As is known in the art, the stator core 32 generally comprises a lamination stack having the plurality of laminations stacked axially relative to the rotational axis 22. The stator winding 34 may be of any construction known in the art and generally includes a plurality of conductors 34. The stator core 32 defines a plurality of slots 36 leaving a plurality of stator teeth 38 therebetween. The plurality of conductors 34 extend axially through the slots 36 and are looped in a conventional fashion around the circumference of the stator 30. As shown in FIG. 1, the stator winding 34 has a plurality of conductors, namely a first conductor 34a, a second conductor 34b, and a third conductor 34c. The conductors 34 preferably have a substantially rectangular cross sectional shape that closely fits the width of said stator slots 36.

The rotor 40 generally includes a pair of opposing pole pieces 42, 44. The rotor 40 is a claw-pole rotor, and as is known in the art, such claw-pole rotors include pole pieces 42, 44 having a plurality of alternating pole fingers 46, 48 defining the annular circumferential surface of the rotor 40. In particular, each pole piece 42, 44 includes a pole yoke 50, 52 which defines an axially facing surface, while the pole fingers 46, 48 extend axially from the pole yoke 50, 52 as shown in the figure. A field coil 54 is sandwiched in between the pair of opposing pole pieces 42, 44. Upon energization of the field coil 54, the rotor 20 is magnetized and the pole fingers 46, 48 alternate between north and south magnetic polarities. Accordingly, it will be recognized that upon rotation of the rotor 40, the alternating magnetic polarities of the pole fingers 46, 48 pass sequentially around the stator 30, thereby inducing an output current in the stator winding 34.

Figure 2:
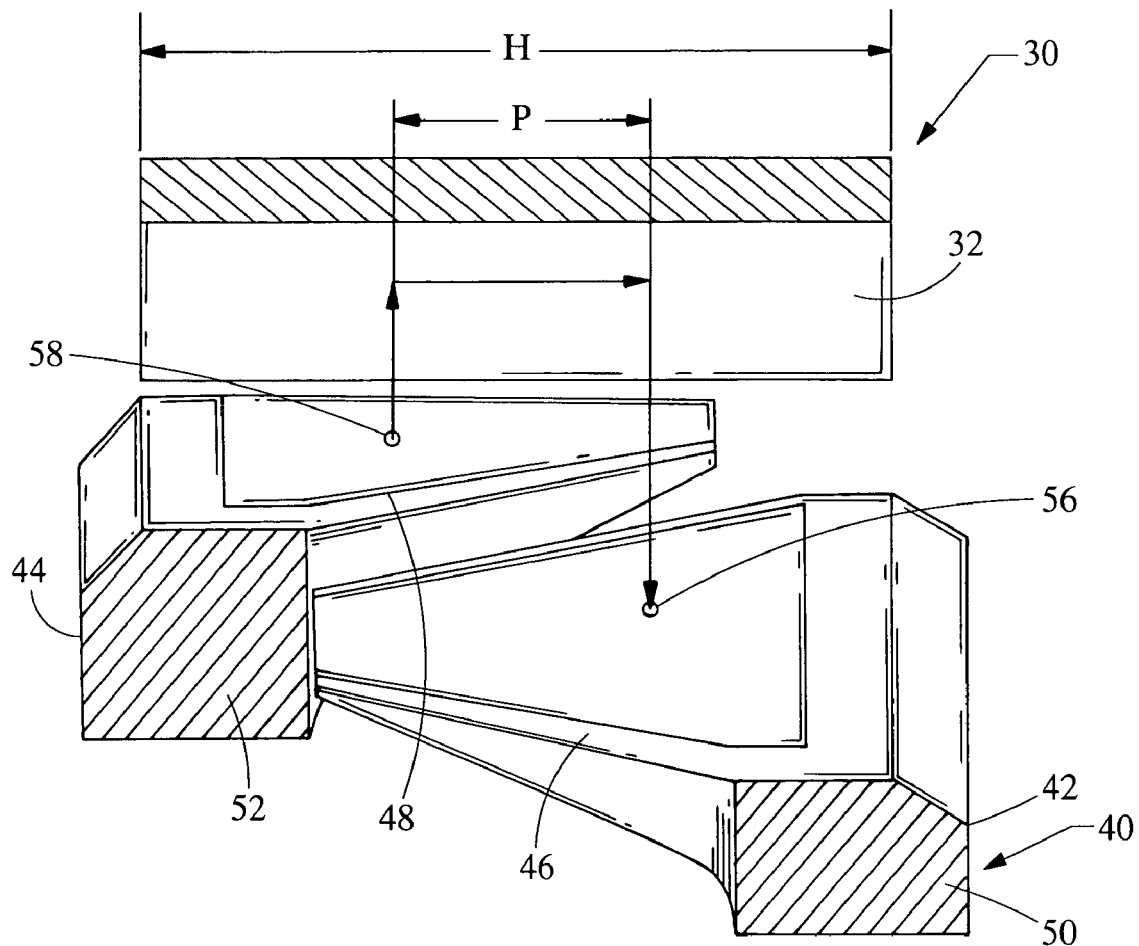
FIG. 2 is front view, partially cut-away, of the electric machine depicted in FIG. 1.

As best seen in FIG. 2, the lamination stack forming the stator core 32 has an axial height H. Generally, as the stack height H of the stator core 32 increases, greater eddy current losses are induced due to the magnetic flux flowing through an increased distance in the axial direction. This eddy current loss is approximately proportional to the axial distance between magnetic centers 56, 58 of adjacent pole pieces 46, 48, which is denoted as P in FIG. 2. Generally, each pole finger 46, 48 has a triangular or trapezoidal shape to its outer surface. Due to this shape of the pole fingers 46, 48, magnetic centers 56, 58 are formed at locations which are axially spaced apart and away from an axial center of the stator 30. The magnetic centers 56 and 58 are defined as the geometric center of the portion of the outer surface of each respective pole finger 46 and 48 that is directly underneath the stator core 32. In other words, the magnetic centers 56, 58 are the geometric center of the area of pole finger surface that is radially beneath the stator core 32. It should be understood, that the stator core 32 can vary in length and may be shorter than the axial length of the pole finger surface.

As shown by the arrows in FIG. 2, the magnetic flux from the north pole piece 48 flows upwardly from magnetic center 58 into the stator core 32, and then axially a distance corresponding to the distance P between the magnetic centers 56, 58, and then radially again to the magnetic center 56 of the adjacent south pole finger 46. This distance P which the magnetic flux travels through the laminations of the stator core 32 results in excessive eddy current loss. This excessive loss is due the changing magnetic flux flowing in the axial direction producing eddy currents that are not broken up by a laminated surface, since the stator core is not laminated in the axial direction.

It will be recognized by those skilled in the art that an increase in the stator core height H results in an increase in the magnetic flux path P between their magnetic centers, thereby increasing the P to H ratio as well as increasing eddy current loss due to excessive axial flux flow.

Accordingly, conventional alternator designs have generally included an axial path distance P that is about one-sixth of the stator core height H, or about 17% of H. Nonetheless, the Applicants have discovered that the P to H ratio can be increased to the range of 0.29 to 0.45 while maintaining an acceptable level of eddy current loss.

Figure 3:
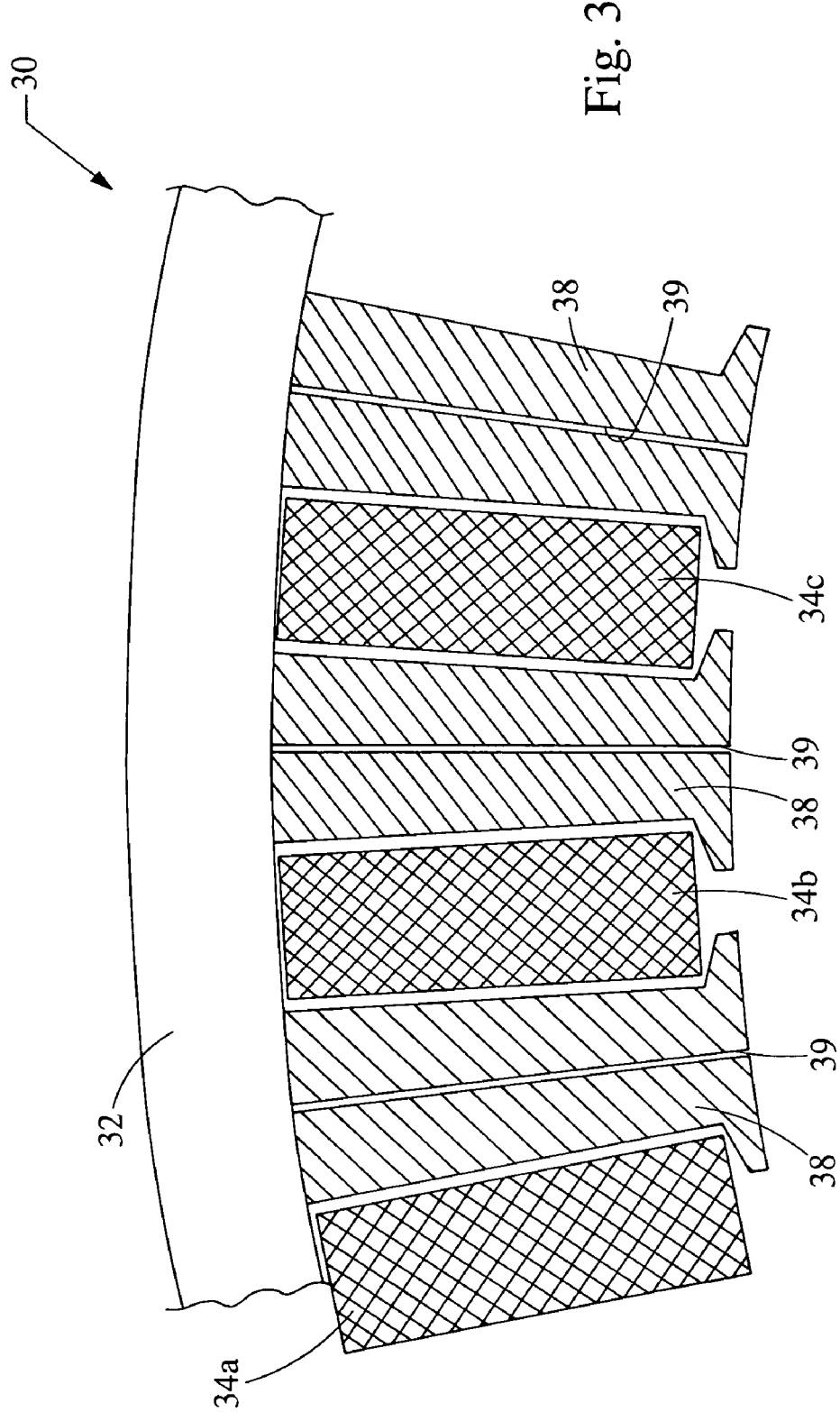
FIG. 3 is a cross-sectional view, partially cut-away, of the stator forming a portion of the electric machine depicted in FIG. 1.

As best seen in FIG. 3, the alternator 30 and its stator core 32 may include a plurality of stator teeth 38 which include a plurality of narrow slots 39 formed therein. In particular, the slots 39 extend radially through the stator teeth 38. By virtue of the narrow slots 39, the stator teeth 38 have a reduced area, or it can be considered that the stator teeth 38 have been laminated in the circumferential direction with a reduced cross-sectional area in the circumferential direction, which thereby reduces the eddy current loss due to magnetic flux flowing axially through the lamination stack 32. Thus, the axial height H of the stator core 32, and/or the axial distance spanned by the pole fingers 46, 48 (or simply their circumferential surface facing the stator 30) may be increased to obtain a alternator 20 having an P to H ratio in the range of 0.29 to 0.45. In this design, the P to H ratio is most preferably between 0.29 and 0.35 to achieve the maximum compromise between alternator power output and eddy current loss.

Figure 4:
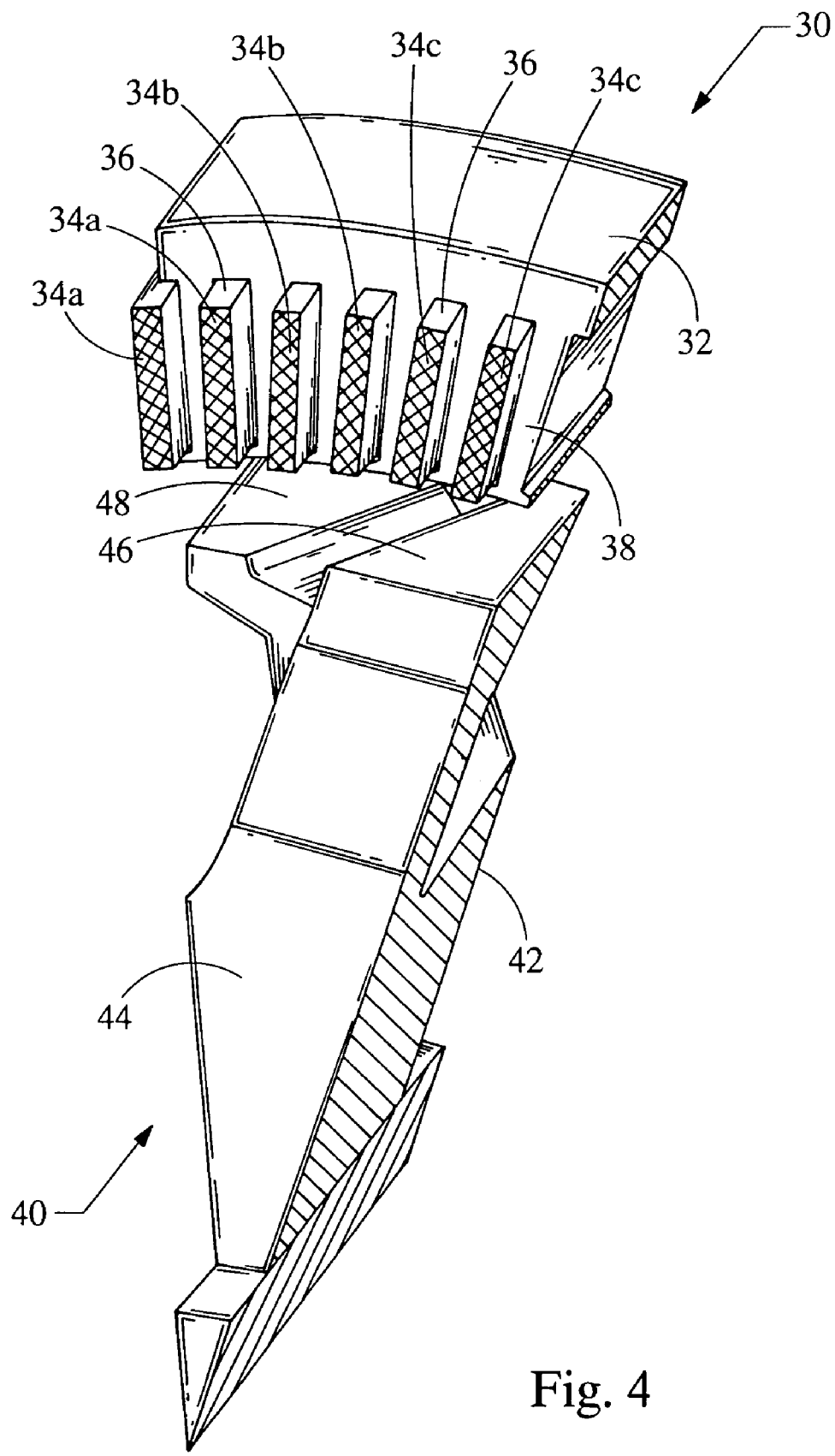
FIG. 4 is a perspective view, partially cut-away, of an alternate embodiment of the electric machine depicted in FIG. 1.

FIG. 4 depicts another embodiment of an alternator stator 30 which can likewise be formed in an alternator 20 having a P to H ratio in the range of 0.29 to 0.45. Generally, the stator 30 includes a stator core 32 comprised of a lamination stack which defines stator teeth 38 that have a smaller width (i.e. circumferential width) than conventional stator 30. In this design, the stator 30 may be a 3-phase or may have greater than three phases. For example, the conductors for phase one (denoted 34a in FIG. 4) may be wound through two adjacent slots 36; the same principle being applied to the phase two conductors 34b and the phase three conductors 34c. In this manner, a 3-phase alternator is provided while the stator teeth 38 have a smaller cross-sectional area to reduce eddy current loss. As a general rule, this embodiment of the alternator stator 30 can be denoted by the number of stator teeth 38 being at least three times greater than the total number of pole fingers 46, 48. Each phase is preferably formed of a continuous conductor wound through the stator core 32.

It will also be recognized by those skilled in the art that the stator core 32 depicted in FIG. 4 could also be employed in an alternator having greater than three phases, such as a 6-phase alternator. For simplicity sake, it could be considered that each of the slots 36 depicted in FIG. 4 would be taken up by conductors from each of the six phases of the winding 34. Further details of such a winding can be found in previously mentioned U.S. Pat. No. 6,750,581 and U.S. patent application Ser. No. 10/723,527. When the alternator is a 6-phase alternator, the number of stator teeth 38 is preferably at least six times greater than the total number of pole fingers 44, 46.

The discovery of the present invention may similarly be applied to alternator designs which employ a permanent magnet. Generally speaking, the rotor 40 depicted in FIG. 5 includes a permanent magnet 60 disposed proximate a distal end of pole finger 48. Accordingly, it will be seen that the permanent magnet 60 is disposed between the pole roots of adjacent pole fingers 46 of pole piece 42. Generally, in these designs the magnetic flux generated by the permanent magnet 60 may flow radially outwardly and then circumferentially through the stator core 32 and then again radially downward into the adjacent pole piece 46. Thus, it will be recognized by those skilled in the art that the permanent magnet 60 generates a magnetic flux which does not travel axially a distance which significantly increases the eddy current loss. As such, the P to H ratio of this disclosure may be applied to alternators of this type.

Figure 5:
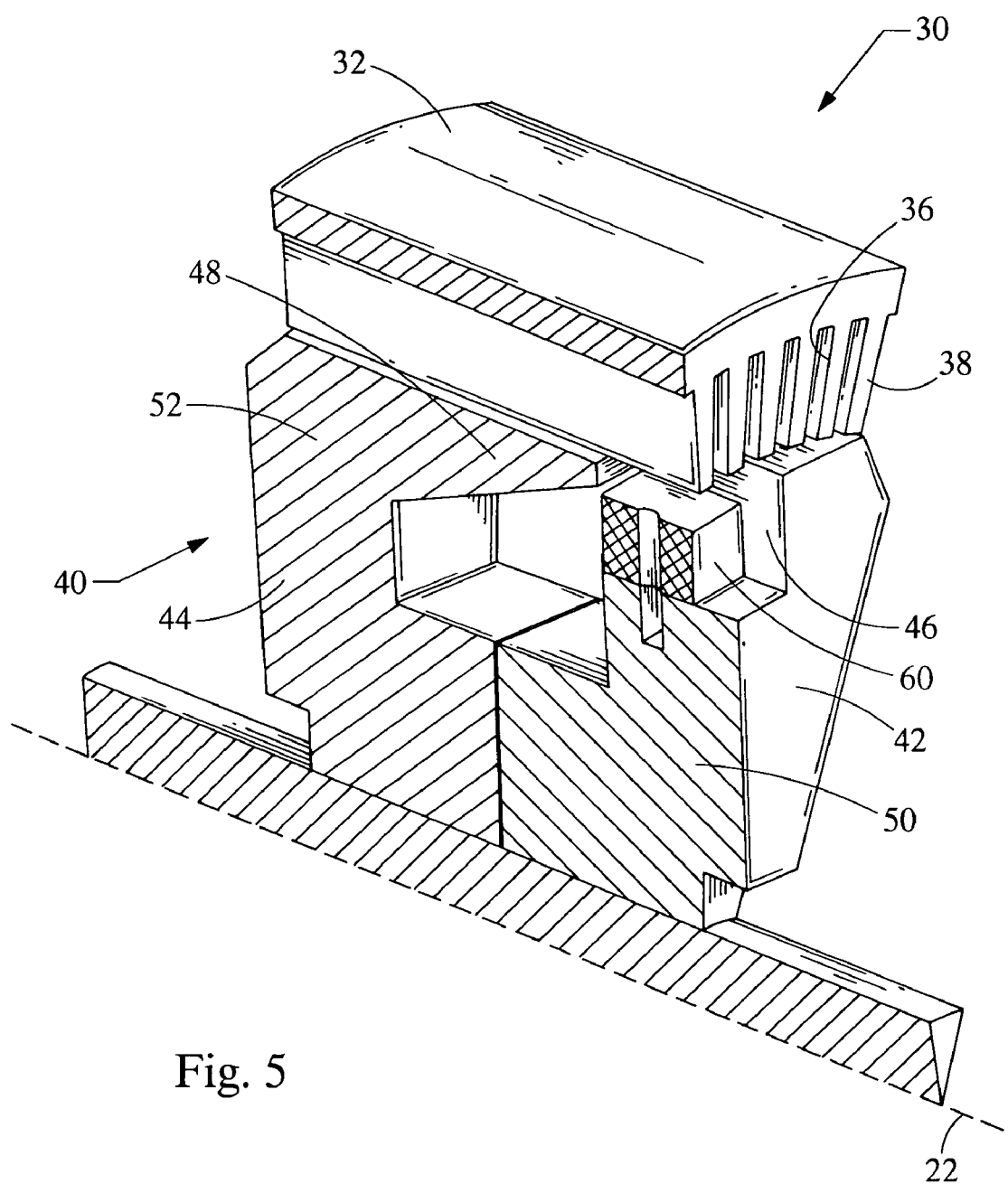
FIG. 5 is a perspective view, partially cut-away, of an alternate embodiment of the electric machine depicted in FIG. 1.

It will be seen in FIG. 5 that the stator core 32 extends axially a distance to cover both the pole finger 48 and the permanent magnet 60. As shown, the height H of the stator core 32 is generally larger than the axial length of the pole fingers 46, 48. On a similar note, and with reference back to FIG. 2, it can be seen that the height H of the stator core 32 extends from just inside the chamfer of the pole finger 48 (on the left side in the figure) to just inside the chamfer formed at the base of pole finger 46 (on the right side in FIG. 2).

Turning back to FIG. 5, this increase in the height H of the stator core 32 causes flux through more of the circumferentially exposed area of the pole fingers 46, 48, thereby increasing the axial path distance P of the magnetic flux, and inherently increasing the P to H ratio of the alternator 20. However, the presence of permanent magnet 60 reduces the affect of the magnetic flux flowing in axial direction, therefore reduces the corresponding eddy current loss, and permits an alternator design having a P to H ratio in the range of 0.29 to 0.45. It will also be recognized that the axial length of the pole fingers 46, 48 may also be directly increased, thereby increasing the axial path distance P. In this manner, the output of the alternator 20 may be increased in an alternator having a P to H ratio in the range of 0.29 to 0.45, while maintaining an acceptable level of eddy current loss.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An electric machine for a motor vehicle, the electric machine comprising:
    a claw pole rotor having a pair of opposing pole pieces sandwiching a field coil therebetween, the rotor defining an axis of rotation, each of the pole pieces having a plurality of circumferentially spaced pole fingers extending axially, the pole fingers of the rotor alternating between north and south magnetic polarities upon energization of the field coil, adjacent pole fingers defining a distance P representing the axial distance between the magnetic centers of the adjacent pole fingers;
    a stator circumscribing the rotor, the stator having a stator core and a stator winding, the stator core including a lamination stack defining a plurality of stator teeth, the stator winding having a plurality of conductors positioned between the plurality of stator teeth and extending axially therethrough, the stator core defining a distance H representing the axial height of the lamination stack; and
    the ratio of P to H (P/H) being in the range of 0.29 to 0.45.

2. The electric machine of claim 1, wherein the ratio of P to H is in the range of 0.29 to 0.35.

3. The electric machine of claim 1, wherein the is a 3-phase.

4. The electric machine of claim 3, wherein the stator teeth have radial slots formed therein.

5. The electric machine of claim 3, wherein the number of stator teeth is at least three times greater than the total number of pole fingers.

6. The electric machine of claim 1, wherein the alternator has a number of phases greater than 3.

7. The electric machine of claim 6, wherein the alternator is a 6-phase alternator.

8. The electric machine of claim 6, wherein the number of stator teeth is at least six times greater than the total number of pole fingers.

9. The electric machine of claim 1, wherein the alternator includes a permanent magnet disposed between adjacent pole fingers of a single pole piece.

10. The electric machine of claim 9, wherein the permanent magnet is disposed proximate a distal end of the pole finger located between the adjacent pole fingers of the single pole piece.

11. The electric machine of claim 1, wherein the lamination stack of the stator core extends an axial distance greater than or about equal to the axial distance spanned by the outer circumferential surface of a pole finger.

12. The electric machine of claim 1, wherein the stator teeth have radial slots formed therein.

13. The electric machine of claim 1, wherein the number of stator teeth is three times (3×) greater than the total number of pole fingers.

14. An alternator for a motor vehicle, the alternator comprising:
    a claw pole rotor having a pair of opposing pole pieces sandwiching a field coil therebetween, the rotor defining an axis of rotation, each of the pole pieces having a plurality of circumferentially spaced pole fingers extending axially, the pole fingers of the rotor alternating between north and south magnetic polarities upon energization of the field coil, adjacent pole fingers defining a distance P representing the axial distance between the magnetic centers of the adjacent pole fingers;
    a stator circumscribing the rotor, the stator having a stator core and a stator winding, the stator core including a lamination stack defining a plurality of stator slots between a plurality of stator teeth, the stator winding having a plurality of conductors positioned between the plurality of stator teeth within the stator slots and extending axially therethrough, the stator winding defining 6-phases of conductors, the stator core defining a distance H representing the axial height of the lamination stack; and
    the ratio of P to H (P/H) being in the range of 0.29 to 0.45.

15. The alternator of claim 14, wherein the number of stator teeth is at least six times greater than the total number of pole fingers.

16. The alternator of claim 14, wherein the alternator includes a permanent magnet disposed between adjacent pole fingers of a single pole piece.

17. The alternator of claim 16, wherein the lamination stack of the stator core extends an axial distance greater than or about equal to the axial distance spanned by a pole finger.

18. The alternator of claim 14, wherein the lamination stack of the stator core extends an axial distance greater than or about equal to the axial distance spanned by the outer circumferential surface of a pole finger.

19. The alternator of claim 14, wherein said conductors have a substantially rectangular cross sectional shape that closely fits the width of said stator slots.

20. The alternator of claim 14, wherein each of said conductors forming said phases is made using continuous wire.

* * * * *